United States Patent

[11] 3,599,956

| [72] | Inventor | Arthur J. Harder, Jr.<br>Franklin Park, Ill. |
|---|---|---|
| [21] | Appl. No. | 852,433 |
| [22] | Filed | Aug. 22, 1969 |
| [45] | Patented | Aug. 17, 1971 |
| [73] | Assignee | Coach and Car Equipment Corporation<br>Elk Grove Village, Ill. |

[54] FLUID CUSHIONING ASSEMBLY
22 Claims, 11 Drawing Figs.

[52] U.S. Cl. ............................................. 267/120,
267/131
[51] Int. Cl. ............................................. F16g 5/00
[50] Field of Search ............................................. 267/120,
121, 35, 152, 64, 63, 65, 131

[56] References Cited
UNITED STATES PATENTS
3,140,085  7/1964  Bourcier De Carbon..... 267/64
3,387,840  6/1968  Bechman et al. .............. 267/64

Primary Examiner—James B. Marbert
Attorney—Merriam, Marshall, Shapiro & Klose

ABSTRACT: A fluid cushioning assembly for absorbing the shock of, for example, a seat on a vehicle traveling rough terrain. The assembly includes a cylinder connected to the seat and slidably mounted on the outside of an inner housing connected to a base. The cylinder contains hydraulic fluid and moves in and out (up and down) on the housing in response to the respective application and removal of an external load. Valve means restricts the velocity of outward movement of the cylinder to substantially less than the velocity of the immediately preceding inward movement.

The housing contains a flexible bladder within which is confined a compressible fluid. The bladder is readily removable from the assembly without substantial removal of the housing.

A second hydraulic cylinder is slidably mounted outside the first cylinder and can be raised or lowered to adjust the elevation of the seat.

INVENTOR
Arthur J. Harder Jr.
BY Merriam, Marshall, Shapiro & Klose
ATTORNEYS

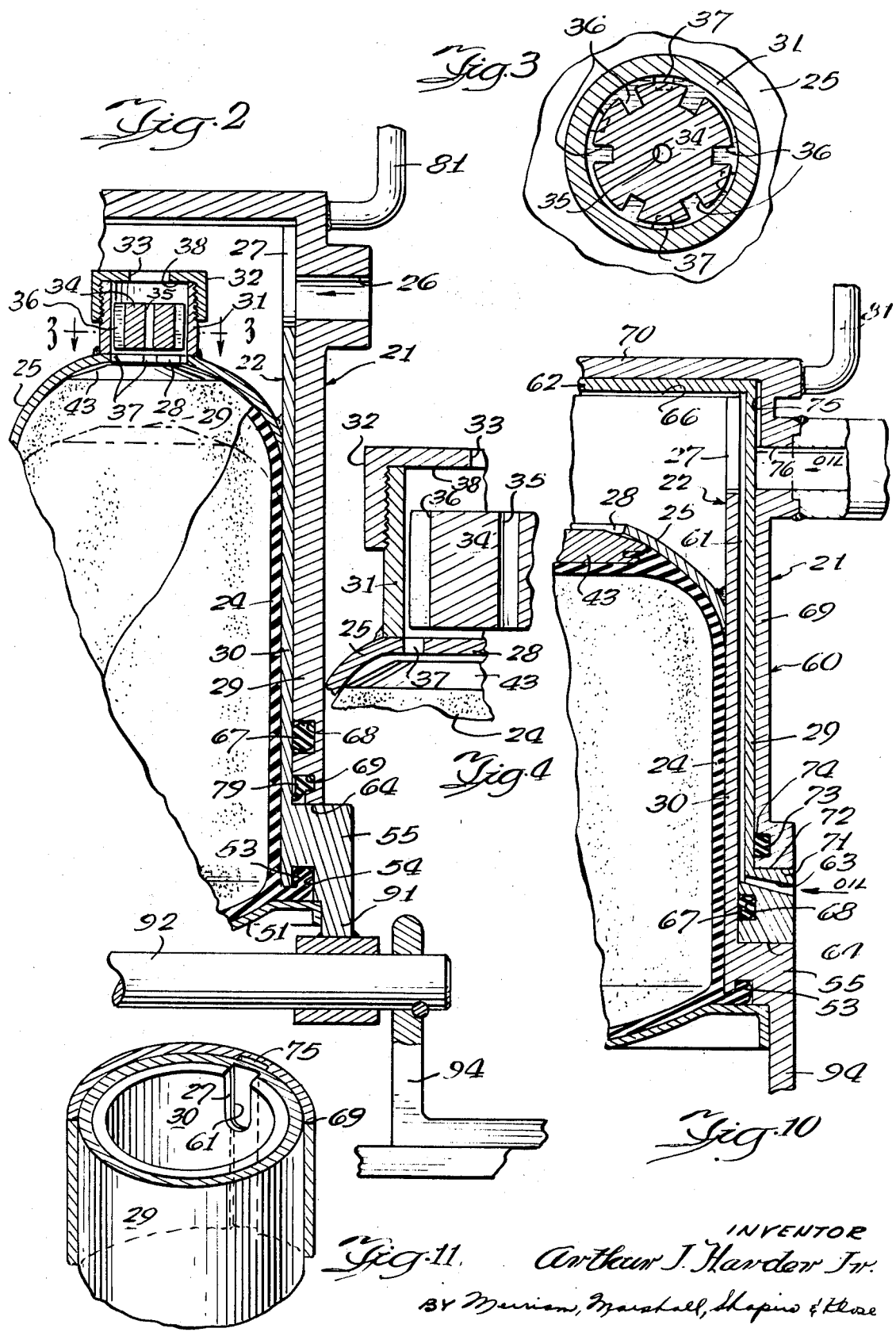

PATENTED AUG 17 1971 3,599,956
SHEET 3 OF 3
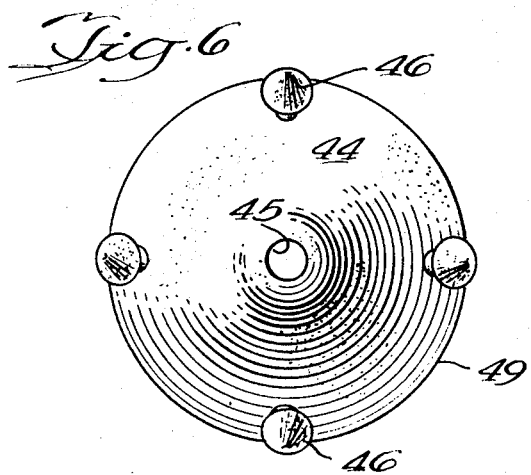
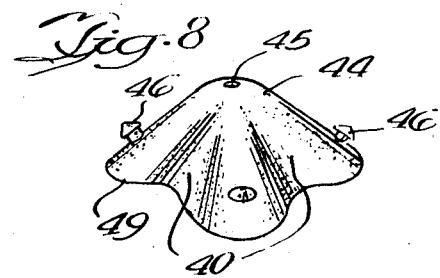
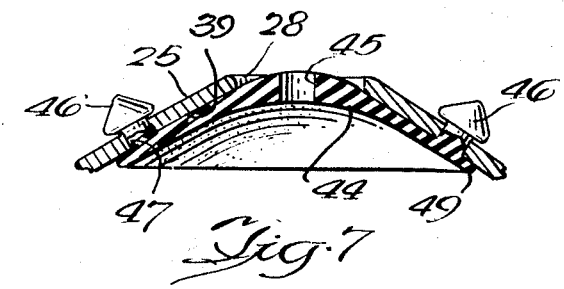
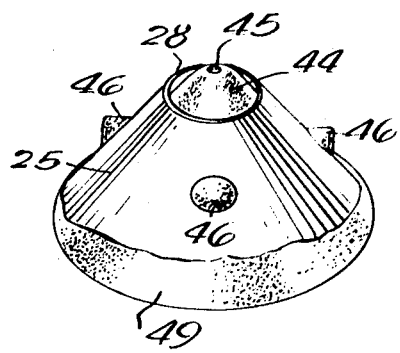
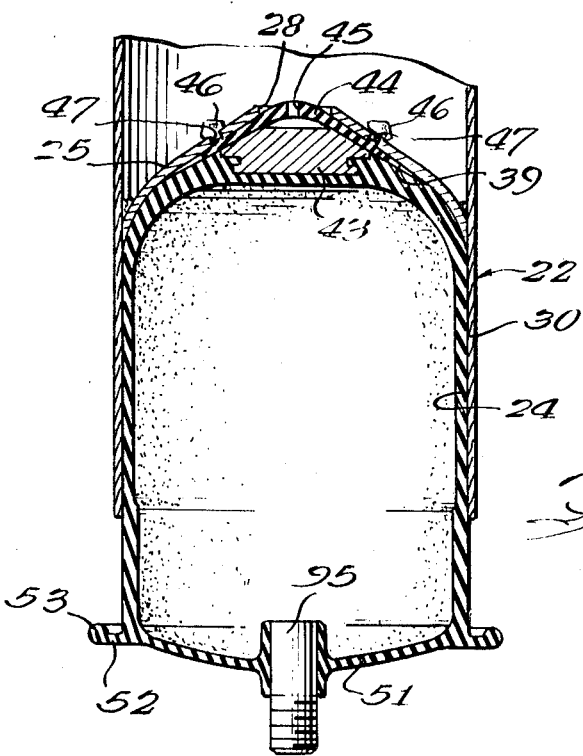
INVENTOR
Arthur J. Harder Jr
BY Merriam, Marshall, Shapiro & Klose
ATTORNEYS

FLUID CUSHIONING ASSEMBLY

BACKGROUND OF THE INVENTION

The present invention relates generally to fluid cushioning assemblies and more particularly to assemblies of this type used as shock absorbers for seats on vehicles traveling rough terrain.

Fluid cushioning assemblies generally comprise a substantially vertical outer cylinder having a closed upper end, containing hydraulic fluid and slidably mounted for inward and outward (up and down) movement relative to an accumulator constituting an internal housing within which is a gastight flexible bladder containing pressurized air. An opening in the housing communicates the interior of the cylinder with the exterior of the flexible bladder. The cylinder is attached to the bottom of the vehicle seat and the housing is mounted on a base for the seat.

As the vehicle travels over rough terrain, the occupant of the seat and the seat bounce up and down. As a result, an external load is momentarily applied to and then removed from the cylinder; and the cylinder moves inwardly and outwardly relative to the housing in response to the application and removal, respectively, of the external load.

Inward movement of the cylinder is transmitted, through hydraulic oil in the cylinder, to the flexible bladder which is contracted and compresses the air therein, thereby cushioning the ride. When inward movement of the cylinder ceases, the compressed air within the flexible bladder urges the bladder to expand or rebound outwardly. Outward movement of the bladder is transmitted through the hydraulic oil to the cylinder which is then moved outwardly relative to the housing.

Unless restricted, outward movement of the cylinder is at a relatively high velocity, comparable to the inward velocity of the cylinder upon application of the external load thereto. A relatively high outward velocity of the cylinder is uncomfortable for the rider on the seat.

SUMMARY OF THE INVENTION

A fluid cushioning assembly in accordance with the present invention restricts the outward movement of the cylinder to a velocity less than that of the immediately preceding inward movement of the cylinder; and this provides a more comfortable ride for an occupant of the seat. This is accomplished by a valve in the channel communicating the interior of the cylinder with the exterior of the bladder in the accumulator. The valve automatically provides a relatively large cross-sectional area for the channel, during an inward movement of the cylinder, and a relatively small cross-sectional area for the channel during expansion or rebound movement of the bladder, thereby restricting the flow rate of oil urging the cylinder outwardly and thus reducing the outward velocity of the cylinder.

The fluid cushioning assembly also includes a readily removable, disposable bladder which can be removed and replaced independent of any other part of the fluid cushioning assembly.

A further embodiment includes a second cylinder telescoped around the outside of the first cylinder and movable outwardly relative to the first cylinder for adjusting the elevation of the seat mounted atop the fluid cushioning assembly.

Other features and advantages are inherent in the structures claimed and disclosed or will become apparent to those skilled in the art from the following diagrammatic drawings and detailed description.

BRIEF DESCRIPTION OF THE DRAWINGS

FIG. 2 is a fragmentary vertical sectional view, partially cut away, of a fluid cushioning assembly including a valve for limiting the outward velocity of the cylinder, in accordance with an embodiment of the present invention;

FIG. 3 is a sectional view taken along line 3—3 in FIG. 2;

FIG. 4 is an enlarged fragmentary view of the valve of FIG. 2;

FIG. 5 is a fragmentary vertical sectional view illustrating another embodiment of a valve for limiting the outward velocity of the cylinder;

FIG. 6 is an enlarged plan view of the valve of FIG. 5;

FIG. 7 is an enlarged sectional view of the valve of FIG. 5;

FIG. 8 is a perspective view illustrating the valve in the condition it assumes during downward or inward movement of the cylinder;

FIG. 9 is a perspective view illustrating the valve in the condition it assumes during an upward or outward movement of the cylinder;

FIG. 10 is a vertical sectional view illustrating an embodiment of the assembly including a second cylinder for adjusting the elevation of a seat mounted on the assembly; and FIG. 11 is a perspective view, partially cut away and partially in section, illustrating a portion of the assembly of FIG. 10.

DESCRIPTION OF PREFERRED EMBODIMENTS

Figure 1:
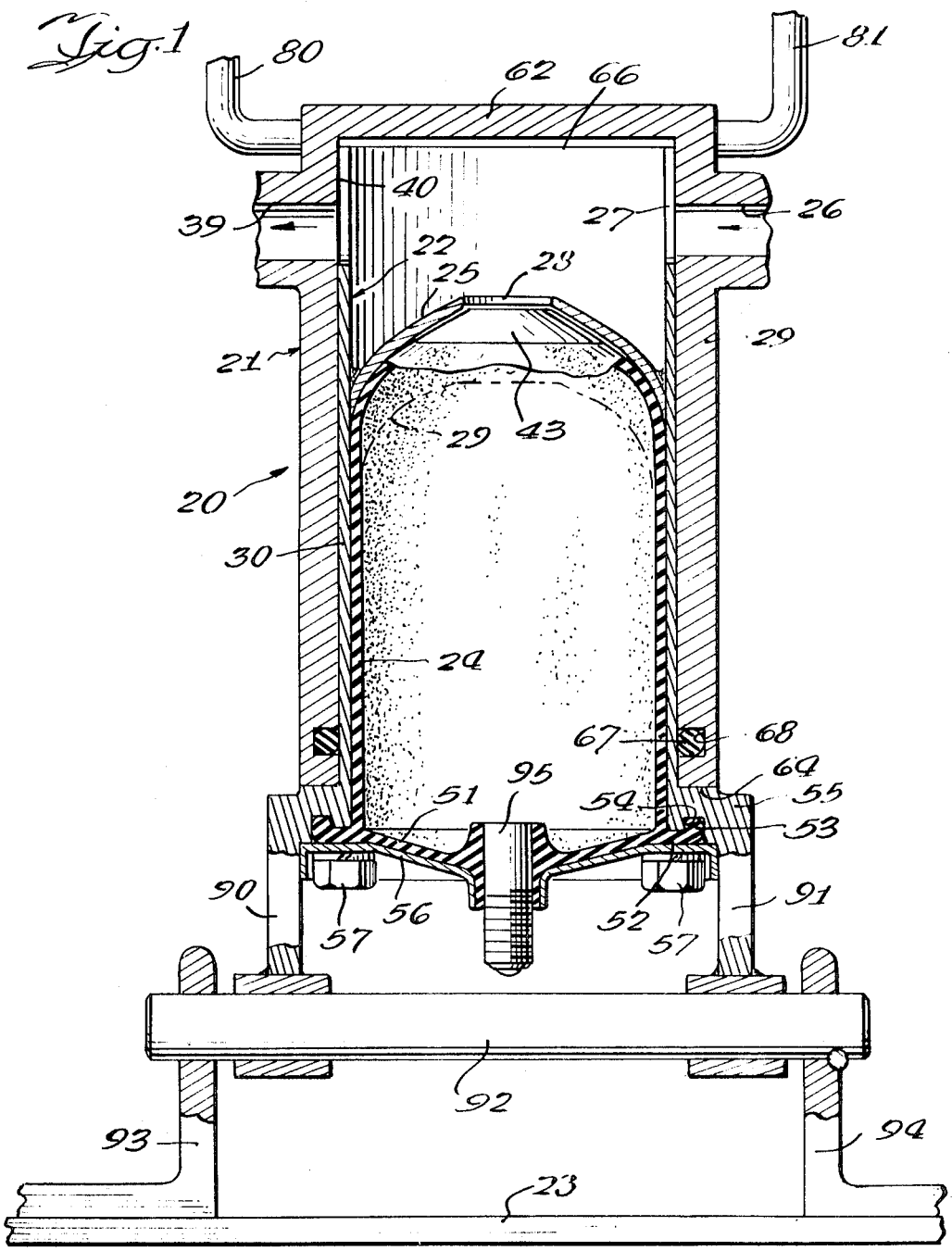
FIG. 1 is a vertical sectional view of a fluid cushioning assembly including a removable bladder in accordance with an embodiment of the present invention.

Referring initially to FIG. 1, there is illustrated a fluid cushioning assembly indicated generally at 20 and comprising an external cylinder 21 slidably mounted on the outside of a housing 22. Cylinder 21 is pivotally connected to a seat (not shown) located above assembly 20, and housing 22 is pivotally connected to a base or platform 23 for the seat. Cylinder 21 is mounted for slidable movement inwardly and outwardly relative to housing 22 in response to the application and removal, respectively, of an external load on the cylinder, e.g., an occupant bouncing on the seat.

Cylinder 21 has sidewalls 29, a head 62 closing the upper end of the cylinder, and an open end at the bottom 64 of sidewalls 29. Housing 22 has sidewalls 30 terminating at an open upper end 66, an end plate 56 closing the bottom of the housing and an internal cap 25 located within sidewalls 30.

Confined within housing sidewalls 30, cap 25 and end plate 56 is a flexible bladder 24 composed of rubber, for example. Bladder 24 encloses air under pressure. All of this constitutes an accumulator.

The interior of cylinder 21 and that part of housing 22 not occupied by bladder 24 contain an hydraulic fluid, such as oil, introduces through a cylinder inlet opening 26 communicating with a vertical slot 27 at the upper end of housing sidewall 30. Introduction of oil into the interior of cylinder 21 urges the cylinder outwardly, upwardly relative to housing 22. Oil may be withdrawn from the cylinder through an outlet opening 39 communicating with a second vertical slot 40 in housing 22.

Housing cap 25 includes an opening 28 providing fluid communication between the interior of cylinder 22 and the exterior of bladder 24. Introduction of oil into the interior of cylinder 22 not only moves cylinder 21 outwardly relative to housing 22 but, also, causes flexible bladder 24 to contract or flex inwardly.

Contraction of bladder 24 compresses the air therein; and it is this compressed air which cushions the ride. The more hydraulic oil introduced into cylinder 21, the greater the contraction of bladder 24 and the greater the resistance of the air therein to further compression. An occupant of the seat can adjust the hardness of the cushioning by adjusting the amount of oil introduced into cylinder 21.

As the vehicle travels over rough terrain, and an occupant of the seat bounces up and down with the seat, there is continual momentary application and then removal of an external load on cylinder 21. When a load is applied to the cylinder, it moves downwardly or inwardly relative to housing 22; and descending cylinder head 62 forces hydraulic oil between head 62 and housing cap 25 through opening 28 in the housing cap and against the exterior of flexible bladder 24, contracting the bladder from the position indicated in full lines in FIG. 1 to the position indicated in dash-dot lines at 29, for example.

The application of the external load to cylinder 21 is only momentary and is immediately followed by a removal of the external load. This in turn removes the pressure against contracted bladder 24 which is urged, by the action of the compressed air therein, to flex outwardly and return or rebound to the expanded full line position in FIG. 1. Rebound movement of bladder 24 is transmitted, by the hydraulic oil, to cylinder 22 causing outward movement of the cylinder.

Rebound movement of bladder 24 is relatively rapid causing, unless restricted, a relatively rapid outward movement of cylinder 21 at a velocity comparable to that of the inward movement of the cylinder. A high outward velocity for the cylinder is undesirable and is minimized by structure to be described in conjunction with FIGS. 2—4 and 5—9.

Referring now to FIGS. 2 through 4, located atop housing cap 25 is a tubular element 31 constituting wall means defining an enclosed passageway communicating with housing opening 28 and located between the exterior of bladder 24 and the interior of cylinder 22. Screwed onto the upper end of tubular element 31 is a cap 32 having a central opening 33 communicating with the upper end of the passageway defined by tubular element 31.

Opening 28 in housing cap 25, the passageway defined by tubular element 31, and opening 33 in threaded cap 32 together define channel means for providing fluid communication between the interior of cylinder 21 and the exterior of flexible bladder 24.

Located within this channel means is a valve in the form of a bushing 34 having a vertically extending central opening 35 and a plurality of vertically extending slots 36 located on the outside of bushing 34. Bushing central opening 35 and outside slots 36 constitute conduits for permitting passage of fluid through the bushing.

Bushing 34 normally rests on a plurality of projections 37 extending inwardly from housing cap 25, at opening 28 therein. Outside slots 36 on bushing 34 are substantially unobstructed by projections 37.

During a downward or inward movement of cylinder 21, hydraulic oil is forced through opening 33 of threaded cap 32, through central opening 35 and outside slots 36 in bushing 34, and then through opening 28 in housing cap 25, applying pressure against flexible bladder 24 and flexing the bladder inwardly to the contracted condition shown in dash-dot lines at 29 in FIG. 2.

When the momentary external load is removed from cylinder 21, flexible bladder 24 is urged, by the compressed air therein, to flex outwardly and rebound back toward the expanded condition illustrated by the full lines in FIG. 2. This forces the hydraulic oil between bladder 24 and housing cap 25 outwardly toward opening 28 in housing cap 25, in turn urging bushing 34 upwardly within tubular element 31 until the top of bushing 34 strikes lip means 38 on the top of threaded cap 32.

Lip means 38 extends laterally inwardly relative to the passageway defined by the walls of tubular element 31 and engages the top of the outside slots 36 on bushing 34, thereby closing slots 36 to the upward passage of hydraulic oil through bushing 34. When this occurs, the only channel in bushing 34 available for upward passage of fluid is central opening 35.

Because the cross-sectional area of the channel means (opening 35), through which oil may exit on an outward flex of bladder 24, is less than the cross-sectional area of the channel means (opening 35 plus slots 36) through which oil can pass during an inward flex of the bladder, there is a substantial reduction in the flow rate of oil outwardly through the upward channel compared to the flow rate inwardly through the downward channels. As a result, the force urging cylinder 21 upwardly, upon release of a load thereon, is applied at a substantially slower rate than the immediately preceding force urging the cylinder downwardly. Accordingly, upward or outward movement of the cylinder is at a velocity substantially less than the velocity of the cylinder during an immediately preceding downward or inward movement.

FIGS. 5 through 9 illustrate another embodiment of a valve for limiting the velocity of outward movement of the cylinder. In this embodiment, the valve is a flap member 44 composed of flexible material such as rubber. Flap member 44 has a conical shape with a lower periphery 49 and an opening 45 at the apex of the cone.

Flap member 44 is sandwiched between frustoconical housing cap 25 and a frustoconical end portion 43 attached to the top of bladder 24. Flap member 44 is held in place, adjacent the inner surface of housing cap 25, by headed projections 46 integral with the flap member and extending through openings 47 in housing cap 25.

The inner surface of housing cap 25 comprises a valve seat 39 for engagement by the upper surface of flap member 44. During downward or inward movement of the cylinder, oil is forced against the upper surface of flap member 44 around the apex of the cone. This causes the flap member to peel inwardly away from valve seat 39 progressively from the apex to the bottom 49 of the cone, until flap member 44 assumes the contracted shape shown in FIG. 8. In this condition of the flap member it is disengaged from valve seat 39 and a multiplicity of channels or passageways 40 (FIG. 8) are formed between the valve seat and the flap member, said channels extending from opening 28 in housing cap 25 to the lower periphery 49 of flap member 44. Channels 40 and flap member central opening 45 permit oil passage from the interior of cylinder 21 to the outer surface of flexible bladder 24, during inward movement of the cylinder, causing an inward flex of the bladder.

When flexible bladder 24 rebounds or flexes outwardly, following removal of the load on the cylinder, it causes upward movement of oil, from bladder 24 toward opening 28 in housing cap 25, which forces flap member 44 into an expanded shape (FIGS. 5, 7 and 9) wherein the flap member engages valve seat 39. In this condition, oil exiting through opening 28 in the housing cap 25 is confined to passage through central opening 45 in flap member 44. The cross-sectional area of central opening 45 is substantially smaller than the cross-sectional area of this opening plus channel means 40, through all of which the oil can pass when flap member 44 is in the contracted shape of FIG. 8. Accordingly, the rate of flow of oil toward cylinder 21 to urge it upwardly or outwardly is substantially less than the rate of flow during downward movement of the cylinder. Therefore, upward movement of the cylinder is at substantially less velocity than downward movement thereof.

Flap member central opening 45 is located inwardly of flap member periphery 49 and communicates with housing cap opening 28 in both the contracted and expanded conditions of the flap member. Both valve seat 39 and flap member 44 have a progressively smaller cross section in a direction away from bladder 24. The flap member is nested within valve seat 39; housing cap opening 28 is located at the smallest cross section of the valve seat, and opening 45 in flap member 44 is located at the smallest cross section of the flap member.

FIG. 1 illustrates an embodiment in which the flexible bladder is readily removable from within bladder housing 22 without substantial removal of the housing from the assembly. Bladder 24 comprises a bottom end 51 having a peripheral sealing flange 52 including an integral O-ring 53 received within a recess 54 in an annular base member 55 constituting a portion of bladder housing 22. Peripheral sealing flange 52 is sandwiched between annular base member 55 and a removable end plate 56 constituting another part of the bladder housing. End plate 56 is held in place by threaded fasteners 57. To remove bladder 24, one merely unscrews threaded fasteners 57 and removes end plate 56. This permits removal of bladder 24 from within housing 22, without removal of the rest of the bladder housing; and bladder 24 can be replaced without replacing the housing.

The embodiment of FIGS. 10 and 11 includes not only a cylinder 21 for adjusting the hardness of the ride but, also, a second cylinder 60 telescoped on the outside of inner cylinder 21, and slidably movable inwardly and outwardly relative to the inner cylinder for adjusting the elevation of the seat.

In this embodiment, first cylinder 21 has a longitudinally extending internal groove 61 in side wall 29 extending downwardly from cylinder head 62 to a laterally extending opening 63 aligned with groove 61 and located near the bottom end 64 of the side wall. Bottom end 64 rests atop housing annular base member 55. The top of internal groove 61 is aligned with slot 27 extending downwardly from open end 66 at the top of housing sidewall 30. Internal groove 61 on cylinder side wall 29 and the outside of housing side wall 30 cooperate to define a longitudinally extending conduit. Hydraulic oil introduced through opening 63 in cylinder 21 travels upwardly through said conduit and into the interior of cylinder 21 at slot 27 of housing wall 30. The pressure of the oil against the inner surface of cylinder head 62 causes inner cylinder 21 to move, together with outer cylinder 60, upwardly relative to housing 22.

Cylinder sidewall 29 has a recess 68 located adjacent cylinder bottom end 64, and recess 68 holds an O-ring 67 which acts as a seal to prevent leakage of hydraulic oil between the outside of housing side wall 30 and the inside of cylinder sidewall 29.

Second or outer cylinder 60 comprises a closed upper end or head 70 and a side wall 69 extending from head 70 and terminating at a lower open end 71 resting on a shoulder 72 of inner cylinder 21. A seal between inner cylinder 21 and outer cylinder 60 is provided by an O-ring 73 received within a recess 74 in outer cylinder 60 near its bottom end 71.

Outer cylinder 60 has an internal groove 75 in side wall 69 extending downwardly from cylinder head 70 to an opening 76 for introducing hydraulic oil into the interior of outer cylinder 60. Internal groove 75 and the outside of inner cylinder sidewall 29 cooperate to define a longitudinally extending conduit communicating with the interior of outer cylinder 60 at cylinder head 70. To elevate the seat, oil is introduced through opening 76. The oil passes upwardly through said conduit and bears against cylinder head 70 causing upward and outward movement of outer cylinder 60 relative to inner cylinder 21.

Because lower end 72 of outer cylinder 60 is located above opening 63 for inner cylinder 21, in all positions of movement of outer cylinder 60, inner cylinder opening 63 is never obstructed by the outer cylinder.

In all embodiments, the assembly is pivotally connected to the seat by a pair of arms 80, 81 (FIG. 1) having a common pivotal axis. In the embodiment of FIG. 10, these arms are connected to outer cylinder 60 while, in the other embodiments, these arms are connected to cylinder 21.

As previously indicated, bladder housing 22 is pivotally connected to seat base 23; and this connection (FIG. 1) comprises a pair of legs 90, 91 extending downwardly from housing base member 55. Legs 90, 91 are pivotally mounted on a shaft 92 supported by a pair of brackets 93, 94 resting atop base 23.

The assembly is provided with a seal between cylinder 21 and housing 22, as shown in FIG. 1. The seal comprises an O-ring 67 received within a recess 68 in cylinder side wall 29 adjacent its lower end 64. In addition, the assembly may be provided with a wiper 79 received within a recess 69 in cylinder sidewall 29 adjacent its lower end 64 (FIG. 2).

As shown in FIG. 1, bladder lower end 51 is provided with a one-way valve 95 for introducing air into the interior of bladder 24.

What I claim is:
1. A fluid cushioning assembly comprising:
a housing;
a cylinder;
means for introducing an hydraulic fluid into the interior of said cylinder;
means telescopically mounting said cylinder on said housing for slidable movement of the cylinder inwardly and outwardly relative to said housing;

accumulator means for confining a compressible fluid;
channel means, communicating the interior of said cylinder with said accumulator means, for the passage of hydraulic fluid between the two; and
valve means, associated with said channel means, for automatically controlling the cross-sectional area of said channel means, during passage of hydraulic fluid from the accumulator means to the cylinder interior, to less than the cross-sectional area of the channel means during passage of hydraulic fluid from the cylinder interior to the accumulator means;
whereby said outward movement of the cylinder is at a velocity less than that of the immediately preceding inward movement of the cylinder.

2. An assembly as recited in claim 1 wherein:
said accumulator means comprises flexible bladder means within said housing;
said channel means comprises an opening in said housing for providing fluid communication between said interior of the cylinder and the exterior of said flexible bladder means;
said compressible fluid being confined within the interior of said bladder means, whereby said bladder means flexes in response to a fluid pressure difference between the interior and exterior thereof;
said valve means comprising means for automatically controlling the cross-sectional area of said channel means, during an outward flex of the bladder means, to less than the cross-sectional area of the channel means during an inward flex of the bladder means.

3. An assembly as recited in claim 2 wherein:
said channel means comprises wall means defining an enclosed passageway communicating with said opening in the housing and located between the exterior of said flexible bladder means and the interior of the cylinder;
said valve means includes a bushing slidably mounted in said passageway;
a plurality of conduits in said bushing to permit passage of fluid therethrough;
means for maintaining all of said conduits open during an inward flex of the bladder means; and
means for closing at least one of said conduits during an outward flex of the bladder means.

4. An assembly as recited in claim 3 wherein:
said passageway has a first end adjacent the bladder means and a second end remote from the bladder means; and
said conduit closing means comprises means extending laterally inwardly relative to said passageway, adjacent the second end thereof, for engaging one end of said bushing and closing said one conduit thereon.

5. An assembly as recited in claim 4 where:
said one conduit in said bushing comprises a slot on the outside of the bushing; and
said conduit closing means comprises lip means.

6. An assembly as recited in claim 2 wherein said valve means comprises:
a flexible flap member;
said bladder housing comprising a valve seat for engagement by said flap member;
means mounting said flap member on said valve seat for flexing of the flap member between a first position disengaged from the valve seat, during an inward flex of the bladder means, and a second position engaged with the valve seat during an outward flex of the bladder means; and
means on said flap member and on said valve seat defining a fluid passageway, between the interior of the closed cylinder and the exterior of the bladder means, when the flap member is in its first position;
said flap member having an opening located inwardly of the periphery of said flap member and communicating with said opening in the bladder housing in both positions of the flap member.

7. An assembly as recited in claim 6 wherein:

said valve seat and said flexible flap member each have a progressively smaller cross section in a direction away from said bladder means;

said flap member is nested within said valve seat;

the opening in said bladder housing is located at the smallest cross section of the valve seat; and the opening in said flap member is located at the smallest cross section thereof.

8. An assembly as recited in claim 6 and comprising:

means urging said flexible flap member to a contracted shape during an inward flex of the bladder means and to an expanded shape during an outward flex of the bladder means.

9. An assembly as recited in claim 2 wherein:

said cylinder has a sidewall extending from said closed end of the cylinder on the outside of said housing;

said housing having a sidewall;

means on the inside of the cylinder sidewall and on the outside of the housing sidewall cooperating to define a longitudinally extending conduit for said hydraulic fluid;

a laterally extending opening in said cylinder side wall aligned with and communicating with said conduit; and means communicating said conduit with the interior of the cylinder.

10. An assembly as recited in claim 9 wherein:

said conduit-defining means on the inside of the cylinder wall comprises a longitudinally extending internal groove.

11. An assembly as recited in claim 10 wherein:

said housing sidewall terminates at an open end adjacent the closed end of the cylinder; and said means communicating said conduit with the interior of the cylinder comprises an opening in the side wall of said housing at the open end thereof.

12. An assembly as recited in claim 9 and comprising:

a second cylinder having a closed end and an open end;

means mounting said second cylinder on said first-recited cylinder for slidable movement of the second cylinder inwardly and outwardly relative to the first recited cylinder;

said second cylinder having a sidewall extending from said closed end of the second cylinder, on the outside of the first recited cylinder;

said opening in the sidewall of the first recited cylinder being unobstructed by the sidewall of the second cylinder in all positions of movement of the latter;

means on the inside of the second cylinder side wall and on the outside of the sidewall of the first recited cylinder cooperating to define a longitudinally extending second conduit for fluid;

an opening in the sidewall of said second cylinder communicating with said second conduit; and means communicating said conduit with the interior of said second cylinder.

13. An assembly as recited in claim 12 wherein:

said conduit-defining means on the inside of the second cylinder sidewall comprises a longitudinally extending internal groove.

14. An assembly as recited in claim 13 wherein:

said groove on the side wall of the second cylinder extends to and terminates at said closed end of the second cylinder.

15. In a cushioning assembly:

a housing;

a cylinder having a closed outer end and an open inner end;

means mounting said cylinder on said housing for slidable movement of the cylinder inwardly and outwardly relative to the housing;

said cylinder having a sidewall extending from said closed end of the cylinder on the outside of said housing;

said housing having a sidewall;

means on the inside of the cylinder sidewall and on the outside of the housing side wall cooperating to define a longitudinally extending conduit for a fluid;

a laterally extending opening in said cylinder side wall aligned with and communicating with said conduit; and means communicating said conduit with the interior of the cylinder.

16. An assembly as recited in claim 15 wherein:

said conduit-defining means on the inside of the cylinder wall comprises a longitudinally extending internal groove.

17. An assembly as recited in claim 16 wherein:

said housing sidewall terminates at an open end adjacent the closed end of the cylinder; and said means communicating said conduit with the interior of the cylinder comprises an opening in the side wall of said housing at the open end thereof.

18. An assembly as recited in claim 15 and comprising:

a second cylinder having a closed end and an open end;

means mounting said second cylinder on said first-recited cylinder for slidable movement of the second cylinder inwardly and outwardly relative to the first recited cylinder;

said second cylinder having a sidewall, extending from said closed end of the second cylinder, on the outside of the first recited cylinder;

said opening in the sidewall of the first recited cylinder being unobstructed by the sidewall of the second cylinder in all positions of movement of the latter;

means on the inside of the second cylinder side wall and on the outside of the side wall of the first recited cylinder cooperating to define a longitudinally extending second conduit for fluid;

an opening in the sidewall of said second cylinder communicating with said second conduit; and means communicating said conduit with the interior of said second cylinder.

19. An assembly as recited in claim 18 wherein:

said conduit-defining means on the inside of the second cylinder side wall comprises a longitudinally extending internal groove.

20. An assembly as recited in claim 19 wherein:

said groove on the sidewall of the second cylinder extends to and terminates at said closed end of the second cylinder.

21. In combination:

a bladder housing having a cap, an open end opposite said cap, and a sidewall between said cap and said end;

an opening in said cap;

flexible bladder means within said housing and having a first bladder end adjacent the housing cap and a second bladder end adjacent the housing open end;

said housing having an annular base member;

said bladder means having a peripheral sealing flange at said second end thereof;

a removable end plate for closing the open end of said housing and attachable to said annular base member;

said peripheral sealing flange on the bladder means being sandwiched between said annular base member and said removable end plate when the latter is attached to the annular base member;

said bladder means being removable from its housing when said end plate is detached from the annular base member.

22. An assembly as recited in claim 21 wherein:

said peripheral sealing flange on the bladder means includes an integral O-ring; and said annular base member has a recess for receiving said O-ring.